United States Patent [19]

Åström

[11] 4,420,012

[45] Dec. 13, 1983

[54] DEVICE FOR USE IN CONNECTION WITH TAPPING OFF FLUID FROM OR FILLING FLUID INTO A CONTAINER

[75] Inventor: Erik J. H. Åström, Tyresö, Sweden

[73] Assignee: Tekno-Detaljer Sture Carlsson AB, Vallingby, Sweden

[21] Appl. No.: 201,409

[22] PCT Filed: Feb. 28, 1980

[86] PCT No.: PCT/SE80/00054

§ 371 Date: Nov. 2, 1980

§ 102(e) Date: Oct. 31, 1980

[87] PCT Pub. No.: WO80/01796

PCT Pub. Date: Sep. 4, 1980

[30] Foreign Application Priority Data

Mar. 2, 1979 [SE] Sweden ............................. 7901893

[51] Int. Cl.[3] ............................................ F16L 55/10

[52] U.S. Cl. .................................. 137/319; 137/321; 81/3.4; 81/3.1 R; 81/90 C; 81/446; 138/89; 220/284; 220/323

[58] Field of Search ............... 137/315, 319, 320, 321; 138/89; 81/3.34, 3.36, 3.38 R, 3.4, 3.42, 3.1 R, 3.1 P, 90 R, 90 B, 90 C, 90 D, 443, 446; 220/320, 321, 323, 325, 284; 292/256.65, 257, 37

[56] References Cited

U.S. PATENT DOCUMENTS

| | | | |
|---|---|---|---|
| 147,241 | 2/1874 | Cornell | 81/446 |
| 972,384 | 10/1910 | Kellar et al. | 137/321 |
| 1,790,761 | 2/1931 | Ortolon | 81/446 |
| 2,186,925 | 1/1940 | Hooper et al. | 137/321 |
| 2,187,838 | 1/1940 | Penick et al. | |
| 2,191,902 | 2/1940 | Wheaton | 220/284 |
| 3,334,938 | 8/1967 | Sentz | 292/257 |
| 3,550,636 | 12/1970 | Hearne et al. | 138/89 |
| 3,837,242 | 9/1974 | Harper | 81/3.1 R |
| 3,914,966 | 10/1975 | Bello | 220/323 |
| 4,184,504 | 1/1980 | Carmichael et al. | 138/89 |
| 4,214,599 | 7/1980 | Astrom | 137/15 |

FOREIGN PATENT DOCUMENTS

| | | | |
|---|---|---|---|
| 504203 | 6/1920 | France | 137/319 |

*Primary Examiner*—George L. Walton
*Attorney, Agent, or Firm*—Fleit, Jacobson, Cohn & Price

[57] ABSTRACT

A device for use in connection with tapping off fluid from or filling fluid into a container comprises a bell-like housing which is adapted to be removably mounted with an open end thereof over an internally threaded tapping or filling hole in a wall of the container and which is provided with an opening through which fluid may be fed into or discharged from the housing, and a tool for manually operating an externally threaded generally cup-shaped closing plug for said hole, from a position outside the housing. Said tool comprises a shaft which extends slidably and rotatably through a portion of the housing opposite to the open end of the housing, handle means provided at an outer end of said shaft. Said plug holding means comprises expansion means insertable into an outwardly open cavity in the plug, a carrier for said expansion means mounted on the tool shaft, and actuating means for the expansion means which are operative to expand the expansion means into frictional contact under pressure with the side wall of the cavity in the plug in order to improve and simplify the construction of the tool, the carrier is mounted for limited movement on an inner end portion of the tool shaft, while the actuating means are rigidly connected to the tool shaft.

5 Claims, 6 Drawing Figures

Figure 1:
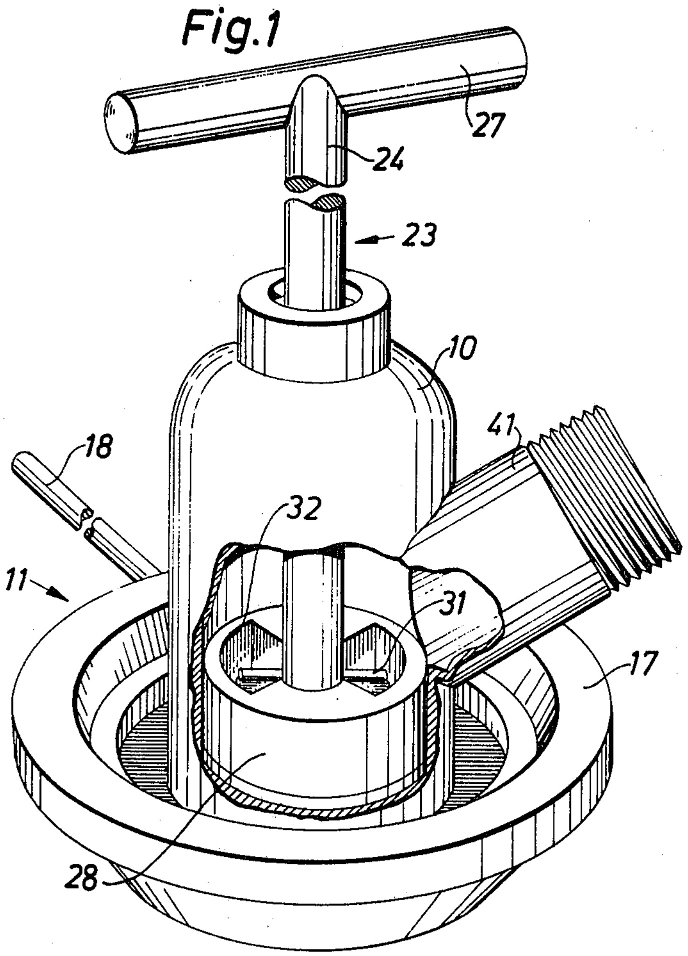

DEVICE FOR USE IN CONNECTION WITH TAPPING OFF FLUID FROM OR FILLING FLUID INTO A CONTAINER

The present invention relates to a device for use in connection with tapping off fluid from or filling fluid into a container through an internally threaded tapping or filling hole provided in a wall of the container, and adapted to be closed by means of an externally threaded generally cup-shaped plug having an outwardly open cavity in which an implement may be inserted for rotating the plug.

More particularly, the invention relates to such a device of the kind comprising a bell-like housing which is adapted to be removably mounted with an open end thereof over said tapping or filling hole and which is provided with an opening through which fluid may be fed into or discharged from the housing, and a tool for manually operating the plug from a position outside the housing, said tool comprising a shaft which extends slidably and rotatably through a portion of the housing opposite to the open end of the housing, handle means provided at an outer end of said shaft, and plug holding means provided at an inner end of said shaft, said plug holding means comprising expansion means insertable into said cavity in the plug, a carrier for said expansion means, said carrier being mounted on the tool shaft, and actuating means for the expansion means, said actuating means being operative to expand the expansion means into frictional contact under pressure with the side wall of the cavity in the plug.

A device of said kind is disclosed in U.S. patent application Ser. No. 947,091, now U.S. Pat. No. 4,214,599. This device makes it possible in an easy manner to remove a plug, or bung, from a container, such as a drum, and to tapp off fluid from or fill fluid into the container, and then to reinsert the plug into the bung hole of the container without having to run the risk of coming into direct contact with the fluid in question.

In said prior device, the actuating means for the expansion means are formed by an end portion of a rod which is displaceably mounted within the shaft of the tool. Although said prior device has proved to operate satisfactorily, the type of actuating means used have been found to cause certain difficulties. Therefore, the present invention has for its purpose to provide an improved device of the kind initially specified, which eliminates said difficulties.

According to the invention, for this purpose, there is provided a device of said kind, wherein the carrier for the expansion means is mounted for limited movement on an inner end portion of the tool shaft, while the actuating means for the expansion means are rigidly connected to the tool shaft.

The carrier could preferably be mounted for limited rotary movement on the tool shaft. Additionally, the actuating means could suitably comprise cam means rigidly connected to the tool shaft and preferably formed as integral portions of the tool shaft.

Figure 4:
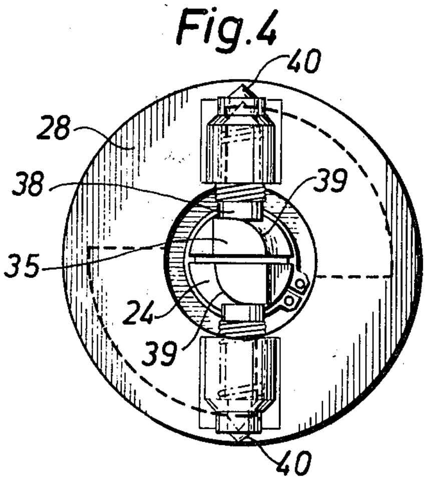
Figure 5:
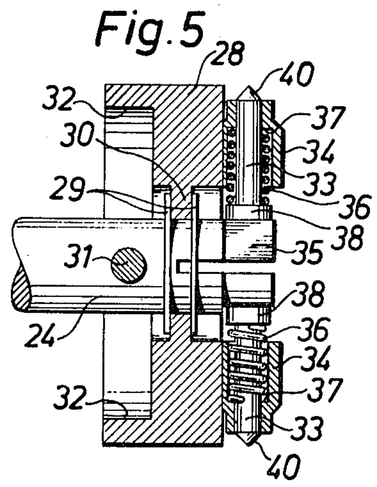
Figure 3:
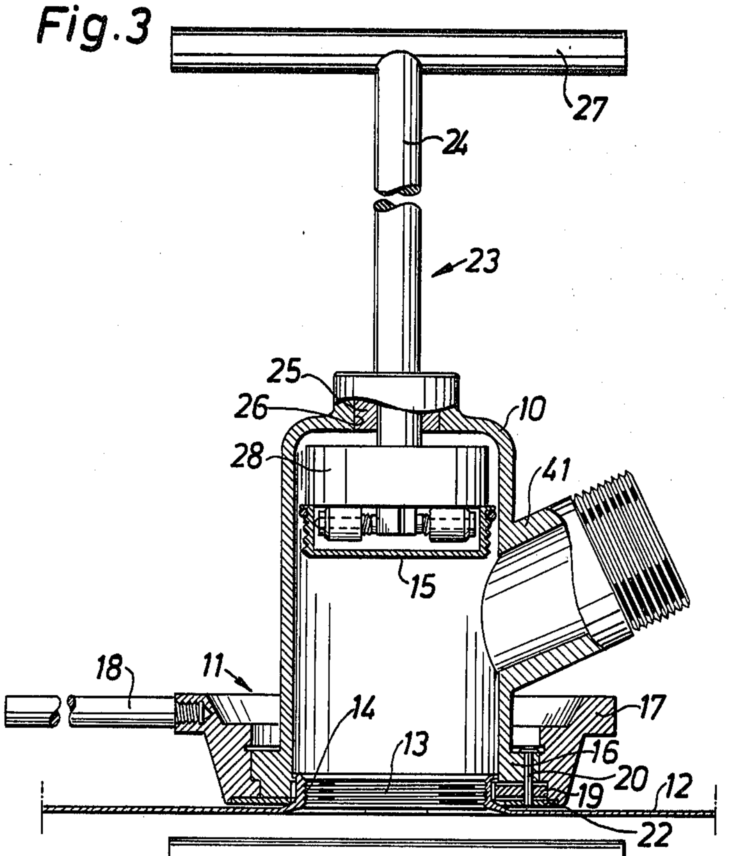
Figure 2:
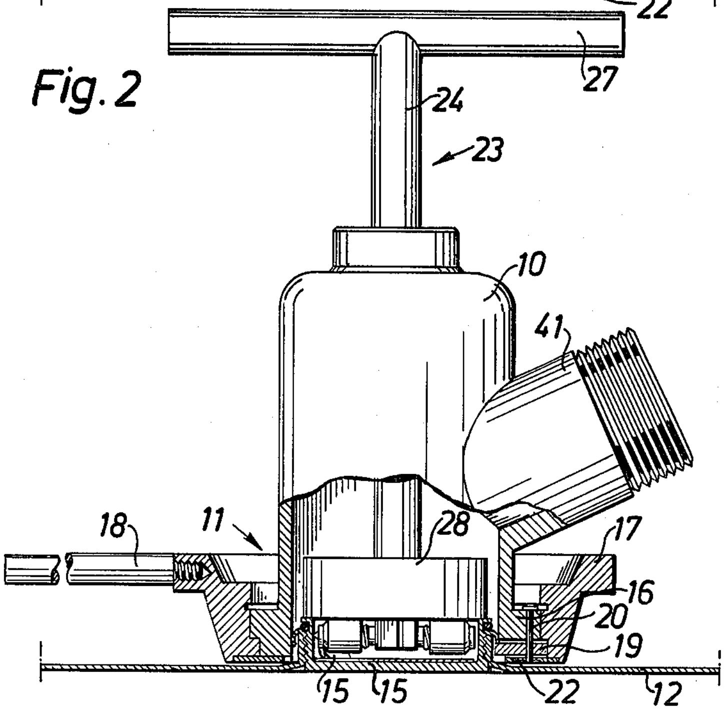
Figure 6:
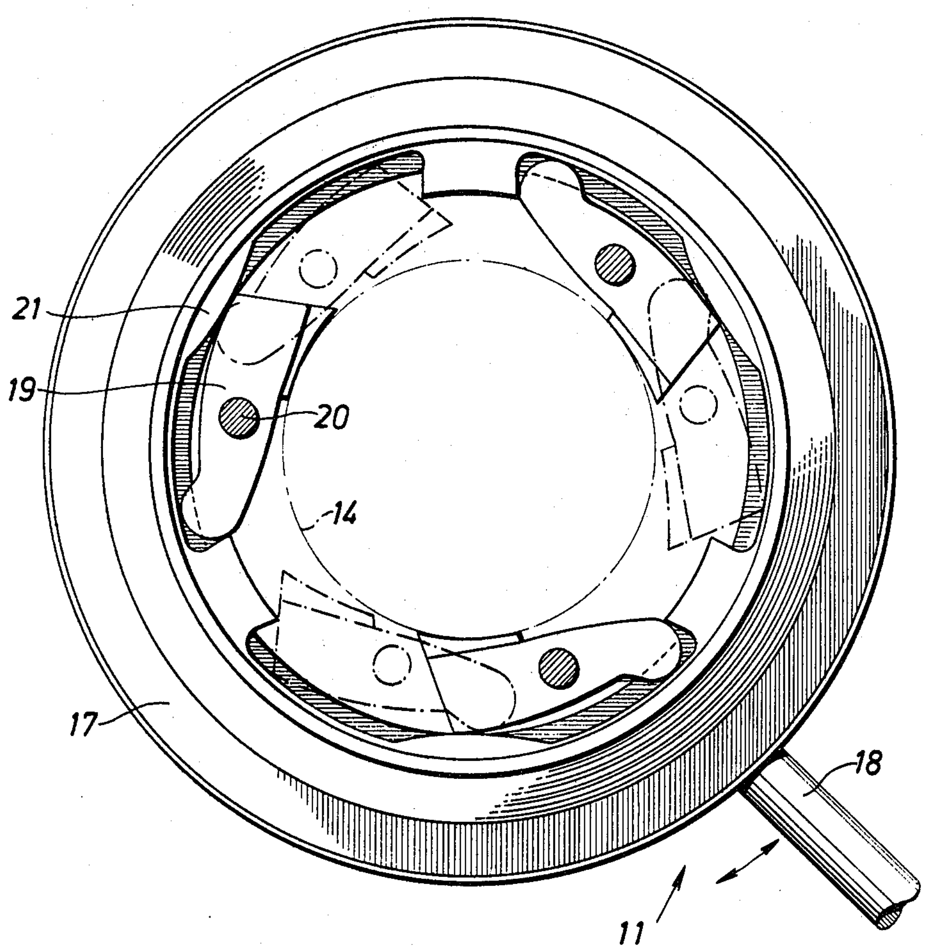

Below the invention will be described in further detail, reference being had to the accompanying drawings, in which:

FIG. 1 shows a perspective view of a device according to one embodiment of the invention, selected by way of example, portions of the device being cut away for the purpose of clarification, FIG. 2 is a side elevation, partly in section, of the device according to FIG. 1, showing the device mounted over a bung hole in a wall of a container and with a tool of the device in engagement with a bung threaded into the bung hole and closing said hole, FIG. 3 is a side elevation, partly in section, corresponding to FIG. 2, but illustrating the tool of the device in a retracted position distant from the bung hole and wherein the device permits free passage for fluid through the same to and from the bung hole, FIG. 4 is an end view of the tool, as viewed from the inner end thereof, FIG. 5 is a sectional lateral view of an inner end portion of the tool, and FIG. 6 is an end view of retention means of the device by which the device may be locked to an annular flange surrounding the bung hole.

The device, shown in the drawings, comprises a bell-like housing 10 forming the body of the device and having an open end where a retention or locking device 11 is provided to make it possible to lock housing 10 over a bung hole 13 in a wall 12 of a container, as illustrated in FIGS. 2 and 3. Said bung hole 13 forms a tapping and filling hole through which fluid may be tapped off from or fed into the container. The bung hole 13 is surrounded by an internally threaded annular flange 14 projecting from container wall 12 and it is adapted to be closed by means of a bung 15 formed as an externally threaded cup-shaped plug having an outwardly open cavity.

The locking device 11 comprises a ring 17 rotatably mounted on a circumferentially extending flange 16 of housing 10 and provided with a radially projecting operating handle 18, and three clamping jaws 19 which are pivotally connected to flange 16 by means of pivot pins 20 and which are arranged, upon rotation of ring 17, to move between locking positions, shown in full lines in FIG. 6, and release positions, shown in dash-dotted lines. The movement of clamping jaws 19 is controlled by cams 21 provided on ring 17. In their locking positions, the clamping jaws 19 will rest under pressure against the outer side of flange 14 and lock housing 10 firmly over hole 13. Cams 21 as well as major portions of jaws 19 are concealed behind an annular cover plate 22 (FIGS. 2 and 3) which has been removed in FIG. 6.

The device further comprises a tool generally designated 23. When housing 10 has been mounted over hole 13, plug 15 may be manually operated from a position outside the housing by means of said tool 23. Tool 23 comprises a shaft 24 of solid circular cross-section which is displaceably and rotatably mounted in a bushing 25 provided in a bore 26 in the wall of housing 10, opposite to the open end of the housing. At its outer end, which is located outside housing 10, shaft 24 is provided with a handle formed by a cross rod 27. At its opposite end, i.e. at its inner end, shaft 24 is provided with a circular plate 28 which is mounted for limited rotation on shaft 24 and fixed in axial position on said shaft by means of two locking rings 29 located on opposite sides of a hub portion 30 of plate 28 and partially received in peripheral grooves in shaft 24. Reference numeral 31 designates a cross pin mounted in shaft 24 and projecting, on each side of shaft 24, into a generally sector-shaped recess 32 provided in plate 28 in the side thereof facing the interior of housing 10. Each recess 32 has a sector angle about 90°. Hereby plate 28 may rotate freely a corresponding angle around shaft 24. On the other hand, it may be rotated by shaft 24 and through the action of pin 31 as soon as said pin has been brought into contact with any of the two generally radially extending walls of each recess 32.

Plate 28 serves as a carrier for the two pins 33 forming the expansion means by which plug 15 may be held firmly on tool 23. Said pins 33 are mounted for longitudinal displacement in two guide sleeves 34 which are secured to plate 28 in spaced apart positions on the side of said plate facing the open end of housing 10. The two guide sleeves 34 are arranged in axial alignment with each other on opposite sides of an end portion 35 of tool shaft 24 which projects into the space between the two guide sleeves 34. In addition to the respective pin 33, each guide sleeve 34 also contains a spring 36 acting between a radially extending shoulder 37 within the sleeve and an enlarged head 38 at the inner end of pin 33. Hereby, springs 36 will force pins 33 into contact with their heads 38 against two opposite cam surfaces 39 on end portion 35 of shaft 24. Said cam surfaces 39 are shaped so as to make it possible, through a limited rotary movement of shaft 24 with respect to plate 28, to move pins 33 between expanded positions, shown in FIG. 5 and in which the outer pointed ends 40 of pins 33 project from the guide sleeves 34 into frictional engagement with the peripheral upstanding side wall of plug 15 surrounding the cavity in said plug, and retracted positions, shown in dash-dotted lines in FIG. 4 and in which the tapered outer ends 40 of pins 33 are located inside the outer ends of guide sleeves 34. As can be seen from FIGS. 4 and 5, end portion 35 of tool shaft 24 is slotted. Hereby, the two cam surfaces 39 are slightly flexible to compensate for minor variations in the inner diameter of plug 15.

The device above described may be used in the following manner. The device is placed with the open end of housing 10 around flange 14 of hole 13 in container 12, whereupon the device is locked to said flange by means of clamping jaws 19 through rotation of ring 17 by means of handle 18.

Tool 23, which until now has been in a position corresponding to the position shown in FIG. 3, is then pushed deeper into housing 10 so that the peripheral portion of the lower side of plate 28 is brought into contact with the upper edge of plug 15, while pins 33, which should be in their retracted positions, and guide sleeves 34 are moved into the cavity in the plug. As normally is the case in connection with threaded bungs, plug 15 is provided with two lips projecting a short distance into the cavity from diametrically opposite locations around its periphery. One such lip 15' has been schematically illustrated in FIG. 2. In order to avoid any obstruction by lips 15' against the insertion of pins 33 and guide sleeves 34 into the cavity of plug 15, it may be necessary to turn tool 23 a limited angle by means of handle 27. When the tool has finally been inserted into the cavity of the plug, the tool is turned in a counterclockwise direction until guide sleeves 34 have been brought into contact with the opposite lips 15' of plug 15. When tool 23 and shaft 24 is then further rotated about 90°, pins 33 are expanded into engagement with the wall of plug 15 through the action of cam surfaces 39 which are rotated relative to plate 28 and pins 33. Tool 23 will now hold plug 15 firmly in position thereon. When the tool 23 is then still further rotated in counter-clockwise direction, it will unscrew plug 15 from hole 13 whereupon the tool and the plug held thereon may be retracted to the position shown in FIG. 3, wherein free passage of fluid is permitted through housing 10 between bung hole 13 and a connecting pipe 41 projecting from an opening in the wall of housing 10 and serving as a connection for a hose or other conduit through which fluid may be fed to or from the container. Plug 15 may then easily be reinserted in hole 13 by means of tool 23. To this end, tool 23 is pushed towards hole 13 and then rotated in a clockwise direction. When plug 15 has been threaded fully into hole 13, pins 33 will, upon continued rotation of tool 23, be retracted from their engagement with the upstanding wall of the plug due to relative rotation taking place between tool shaft 24 and plate 28. Plug 15 may then be tightened up by rotating shaft 24 further until guide sleeves 34 contact lips 15' whereupon the tool can transmit tightening forces to the plug through sleeves 34.

The invention is not restricted to the embodiment above described and shown in the drawings. Instead, many modifications are feasible within the scope of the invention. Especially, it should be mentioned that the carrier for the expansion means need not be mounted for limited rotary movement on the tool shaft. Thus, instead it may for instance be mounted for limited axial displacement on the tool shaft.

I claim:

1. A device for use in connection with tapping off fluid from or filling fluid into a container through an internally threaded tapping or filling hole provided in a wall of the container and adapted to be closed by means of an externally threaded generally cup-shaped plug having an outwardly open cavity in which an implement may be inserted for rotating the plug, said device comprising a bell-like housing which is adapted to be removably mounted with an open end thereof over said tapping or filling hole and which is provided with an opening through which fluid may be fed into or discharged from the housing, and a tool for manually operating the plug from a position outside the housing, said tool comprising a shaft which extends slidably and rotatably through a portion of the housing opposite to the open end of the housing, handle means provided at an outer end of said shaft, and plug holding means provided at an inner end of said shaft, said plug holding means comprising expansion means insertable into said cavity in the plug, a carrier for said expansion means, said carrier being mounted on the tool shaft, and actuating means for the expansion means, said actuating means being operative to expand the expansion means into frictional contact under pressure with the side wall of the cavity in the plug, characterized in that the carrier (28) for the expansion means (33) is mounted for limited movement on an inner end portion of the tool shaft (24), while the actuating means (39) for the expansion means (33) are rigidly connected to the tool shaft (24).

2. A device according to claim 1, characterized in that the carrier (28) is mounted for limited rotary movement on the tool shaft (24).

3. A device according to claim 1 or 2, characterized in that the actuating means comprise cam means (39) rigidly connected to the tool shaft (24).

4. A device according to claim 3, characterized in that the cam means (39) are formed as integral portions of the tool shaft (24).

5. A device for use in connection with tapping off fluid from or filling fluid into a container through an internally threaded tapping or filling hole provided in a wall of the container and adapted to be closed by means of an externally threaded generally cup-shaped plug having an outwardly open cavity in which an implement may be inserted for rotating the plug, said device comprising a bell-like housing which is adapted to be removably mounted with an open end thereof over said tapping or filling hole and which is provided with an opening through which fluid may be fed into or discharged from the housing, and a tool for manually operating the plug from a position outside the housing, said tool comprising a shaft which extends slidably and rotatably through a portion of the housing opposite to the open end of the housing, handle means provided at an outer end of said shaft, and plug holding means provided at an inner end of said shaft, said plug holding means comprising expansion means insertable into said cavity in the plug, a carrier for said expansion means, said expansion means mounted at or near the outer end of said carrier, said carrier being mounted on the tool shaft and arranged to abut the outer edge of the plug, and actuating means for the expansion means, said actuating means being operative to expand the expansion means into frictional contact under pressure with the side wall of the cavity in the plug, characterized in that the carrier for the expansion means is mounted for limited movement on an inner end portion of the tool shaft, while the actuating means for the expansion means are rigidly connected to the tool shaft.

* * * * *